United States Patent [19]

Höcheri

[11] Patent Number: 5,671,599
[45] Date of Patent: Sep. 30, 1997

[54] SOLID-PROPELLANT ROCKET ENGINE WITH INNER AND OUTER BURNER SURFACES

[75] Inventor: Johann Höcheri, Unterhaching, Germany

[73] Assignee: Bayern-Chemie Gesellschaft für Flugchemische Antriebe GmbH, Aschau, Germany

[21] Appl. No.: 613,258

[22] Filed: Mar. 8, 1996

[30] Foreign Application Priority Data

Mar. 11, 1995 [DE] Germany .......................... 19508830.1

[51] Int. Cl.$^6$ ............................................. F02K 9/10
[52] U.S. Cl. ................................................. 60/234; 60/253
[58] Field of Search ............................. 60/234, 253, 254, 60/255

[56] References Cited

FOREIGN PATENT DOCUMENTS 2 075 644   11/1981   United Kingdom .

Primary Examiner—Louis J. Casaregola
Attorney, Agent, or Firm—McGlew and Tuttle

[57] ABSTRACT

Solid-propellant rocket engine with a combustion chamber, with a thrust nozzle, with one or more grains in the combustion chamber, at least one of which comprises two parts, namely, an inner burner part and an outer burner part, wherein the latter is connected to a support structure, has a cross section changing over its length, is accommodated in the hollow space of identical shape of the inner burner part, and is axially displaceable. A thermal barrier is arranged at the nozzle-side end of the two-part grain. The outer burner part is fitted gap-free into the inner burner part. The contour formed by the contact surfaces of the two grain parts encloses a cross section expanding from the front to the rear. The outer burner part can be moved from a front, inactive position, which is positive-locking with the inner burner part, into a rear, active position with a defined flow gap between the contact surfaces of the grains.

10 Claims, 1 Drawing Sheet

SOLID-PROPELLANT ROCKET ENGINE WITH INNER AND OUTER BURNER SURFACES

FIELD OF THE INVENTION

The present invention pertains to a solid-propellant rocket engine with a combustion chamber, with at least one thrust nozzle at the downstream end of the combustion chamber, and with one or more grains (one or more single pieces of said propellant) arranged in the combustion chamber, at least one of which comprises two parts, one part of which is designed as an inner burner and the other as an outer burner, wherein the outer burner part is connected to a support structure and has a cross-section changing over its length and is arranged at least largely in a hollow space of identical shape of the inner burner part and is axially displaceable relative to same and wherein a thermal barrier is arranged at the nozzle side end of the two part grain.

BACKGROUND OF THE INVENTION

Such an engine is described in, e.g., U.S. Pat. No. 3,349,565. This has a solid propellant grain which comprises two parts for controlling the thrust and for maintaining it at a constant value. Its outer burner part is arranged with a circumferential gap extensively within the inner burner part without being in contact with same, so that a defined flow channel is present between the two parts even before the ignition. The nozzle-side front surfaces of the two grain parts are initially located in one plane, and thus they are covered with a disk-shaped thermal barrier occupying the entire combustion chamber cross section. The truncated cone-shaped outer burner part tapering toward the nozzle is held by an axially movable support structure, which passes over, in front of the combustion chamber dome, into a piston-and-cylinder unit, which can be actuated by means of gas pressure difference. The movable outer burner part is displaced further toward the nozzle with increasing burn-up of both grain parts, as a result of which the burn-up conditions in the flow channel between the two grain parts are preferably maintained under constant conditions. It has been known that the intensity of burn-up on adjacent grain surfaces can be increased by decreasing the distance between them and intensifying erosive processes in the gap as a result. The rate of burn-up, the propellant throughput, the combustion chamber pressure, and ultimately the thrust increase locally in the process. Conversely, an increase in the distance between the burning-off surfaces ultimately causes a reduction in thrust. According to the U.S. patent, the difference between the combustion chamber pressure and a reference pressure is used to generate the desired propulsive movement. For adaptation to the propellant throughput, which decreases with increasing burning time, the nozzle cross section is additionally reduced here by the spike-like end of the support structure of the outer burner part increasingly dipping into the nozzle. The above-described solution may appear to be extremely advantageous in theory, but great problems may arise in practice in terms of reliability, which may ultimately lead to the failure of the concept. It is very difficult to keep components extending into or arranged in the combustion chamber movable over a relatively long time under the operating conditions prevailing there. The extremely high temperatures, pressures and accelerating forces often cause guides, bearings, seals, etc., to become unable to function in a very short time. In addition, burning-off particles, which are frequently liquid and extremely adherent, are released. These particles tend to be deposited on surfaces which come into contact with them and therefore to block moving parts, and to constrict or obstruct openings and flow channels, etc. Consequently, the correct function of the above-described grain-adjusting mechanism is doubtful.

The relatively flexible suspension of the grain outer burner part might be another problem. The cantilever beam-like support structure for the central grain part, which may be very heavy, considerably reduces the mechanical load-bearing capacity of the engine, especially in the transverse direction. It also might be hardly possible, e.g., to fire off such engines installed in rocket missiles from guns, because the axial load-bearing capacity is low due to the lack of sufficient support of the two grain parts. If the two-part grain were a secondary grain, it should not be subjected to any intense transverse accelerations even during the phase of operation of the primary grain, which would restrict the maneuverability of the missile in question. There also would be a risk of destruction of the thermal barrier and consequently of an unintended ignition of the secondary grain.

SUMMARY AND OBJECTS OF THE INVENTION

Based on this prior-art solution and its specific disadvantages, the primary object of the present invention is to provide a solid-propellant rocket engine with at least one two-part grain in the outer surface burner/inner surface burner configuration with movable inwardly disposed outer surface burner part, which engine can be designed for single and multiple impulse operation, which engine withstands high mechanical stresses at least in the inactive state of the two-part grain, which engine reliably avoids the unintended ignition of at least one, two-part grain, and is characterized by simple function and high reliability.

According to the invention, a solid-propellant rocket engine is provided with the combustion chamber, with at least one thrust nozzle at the downstream end of the combustion chamber. One or more grains are arranged in the combustion chamber. At least one of the grains comprises two parts, one part which is designed as an outwardly disposed inner surface burner (the burn occurs on an inner face) and the other part forming an outwardly disposed outer surface burner (the burn occurs on an outer face). The outer surface burner is connected to a support structure, has a cross-section changing over its length, is arranged at least partially in the hollow space of identical shape of the inner surface burner part and is axially displaceable relative to the inner burner part. A thermal barrier is arranged at the nozzle-side end of the two-part grain. The outer surface burner part is fitted gap-free into the inner surface burner part. A circumferential contour formed by the contact surfaces of the two grain parts encloses a cross-section expanding from a front end of the grain to a rear, nozzle-side end of the grain. The outer surface burner part can be moved from a front, inactive position, which is positive-locking with the inner surface burner part, into a rear, active position with a defined flow gap between the contact surfaces of the grain parts.

The outer surface burner part and the inner surface burner part of at least one, two-part grain are fitted into each other so well that in the inactive, positive-locking state they form a clearance- and gap-free, compact grain block, which is also able to withstand the loads occurring during firing from a gun as well as during extreme flight maneuvers.

The shape of the contour of the contact surfaces is selected to be such that the outer surface burner part can be moved out of the inner surface burner part in the rearward direction, i.e., toward the nozzle. The outer surface burner part can thus extend with its front side up to the front wall of the combustion chamber in the inactive state (like the stationarily installed inner surface burner part), which is favorable for space utilization and support.

The outer surface burner part is displaced axially in relation to the inner surface burner part only once. This relative movement into a rear, defined end position takes place shortly before or at the the of the ignition of the grain. A subsequent limitation of the mobility of the support structure, e.g., due to warping or deposits, is completely irrelevant, because the outer surface burner part shall remain rigidly in its end position anyway.

The grains are preferably arranged one behind the other in the combustion chamber. The rear primary grain, which is close to the nozzle and is to be ignited first, is designed as a one-part grain as an inner surface burner. The front, secondary grain, which is to be ignited later, is designed as a two-part grain with an inner surface burner part, with an outer surface burner part and with a thermal barrier.

Only one two-part grain may be provided, with an outer surface burner part, with an inner surface burner part and with a thermal barrier arranged in the combustion chamber. The engine may be provided as part of a rocket missile to be fired from a gun and the combustion chamber may be provided open toward the propellant charge of the corresponding gun, i.e., it has no nozzle closure or the like.

The outer surface burner part of at least one two-part grain is preferably designed as a circular truncated cone shaped formation. The inner burner part of the at least one two-part grain may be fastened directly in the same combustion chamber, e.g., it is cast into it and it is hardened in it, or it is cartridged and is indirectly fastened in the combustion chamber via a cartridge wall.

The outer surface burner part of the at least one two-part grain may cast into the inner surface burner part and may be hardened in it to form a detachable, positive-locking connection. The throttle-side front surfaces of the two grains of the at least one two-part grain form a continuous and gap-free contact surface for the thermal barrier in the inactive, front position of the outer burner part. The thermal barrier has a predetermined breaking point corresponding to the shape of a separation line between the inner and outer burner parts on the nozzle-side front surface of the grain. The support structure of the outer surface burner part of the at least one two-part grain comprises at least two tubes which can be telescopically pulled apart to a limited extent. One of the tubes is rigidly connected to the combustion chamber front wall and the other is rigidly connected to the outer surface burner part. The support structure accommodates the igniter of the two-part grain and possibly also the igniter of the additional grain arranged downstream of the two-part grain. The outer surface burner part and/or the support structure may be radially supported at the nozzle-side end of the combustion chamber.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
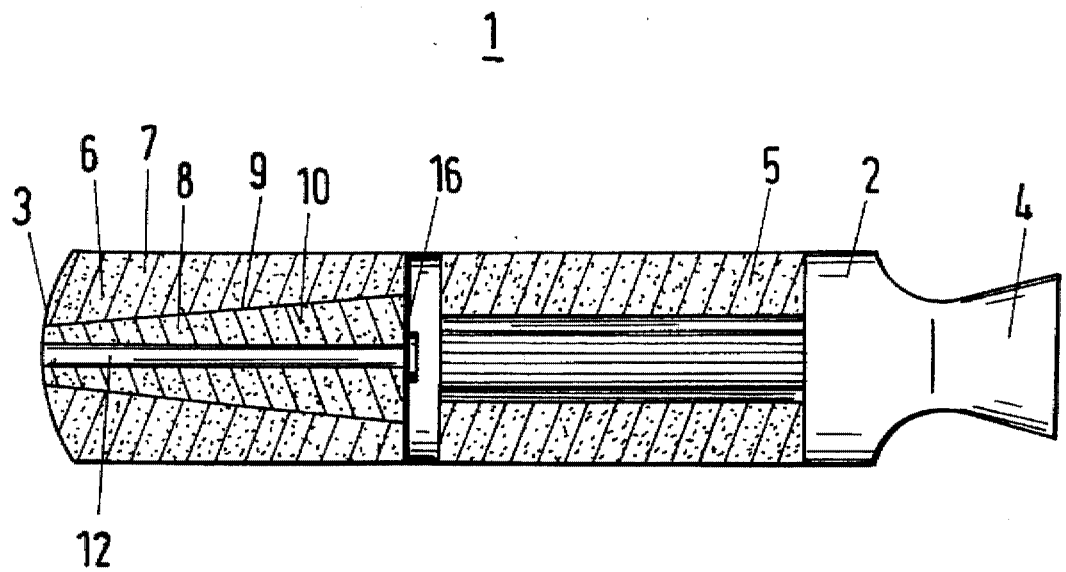
FIG. 1 is a longitudinal sectional view, providing a simplified, non-true-to-scale representation through a solid-propellant rocket engine with a one-part primary grain and a two-part secondary grain.

The solid-propellant rocket engine 1 comprises essentially a combustion chamber 2 containing the two grains and a thrust nozzle 4 connected thereto. At its front end located opposite the thrust nozzle 4, the combustion chamber 2 is closed by means of a combustion chamber front wall 3. The primary grain 5, which is located closer to the nozzle and is to be ignited first, is designed as a one-part grain as an inner surface burner or as a front/inner surface burner. As is indicated in FIG. 1, a central flow channel may have a contour having a star-like serrated pattern to enlarge the surface. Its front surfaces may be provided with burn-up-inhibiting or -retarding coatings (not shown). The primary grain 5 is used essentially for the start and acceleration phase (first phase of thrust) of the corresponding missile, and it usually develops a thrust that is substantially, e.g., three times higher than that of the secondary grain 6.

A secondary grain 6, which usually has a markedly lower burning time at a lower thrust, is provided for the cruise flight (second phase of thrust) of the corresponding missile, not shown. The secondary grain 6 is protected from unintended, premature ignition by a thermal barrier 16, which is in contact with the rear front side of the secondary grain 6 during the first phase of thrust. The secondary grain 6 comprises two parts which engage each other in a positive-locking manner, namely, an outwardly disposed inner surface part 7 and an inwardly disposed outer surface burner part 8, whose contact surfaces 9, 10 define a contour expanding in a circular truncated cone-shaped manner from front to rear. The contact surfaces 9, 10 can be recognized in FIG. 1 as an identical straight cutting line above and below the center of the engine as a consequence of the absence of a gap. The longitudinal section of the contact surfaces may also have a curved shape or a straight shape in some areas and a curved shape in others. The present invention requires only a continuous expansion of the cross section from the front end to the rear end of the grain. Deviating from a simple circular shape, the cross section of the contact surfaces may also have, e.g., regularly serrated or corrugated shapes. The possibly complete absence of a gap is important in every case in order for the grain to behave like a homogeneous block and to withstand high mechanical loads. Both the casting of the inner surface burner part 7 into the combustion chamber structure and the casting of the outer surface burner part 8 into the already hardened inner burner part are advantageous in terms of manufacturing technology. However, the surface adhesion between the two grain parts may be only strong enough to make possible a subsequent separation (at the time of activation) without problems. Parting agent layers shall be optionally used.

Figure 2:
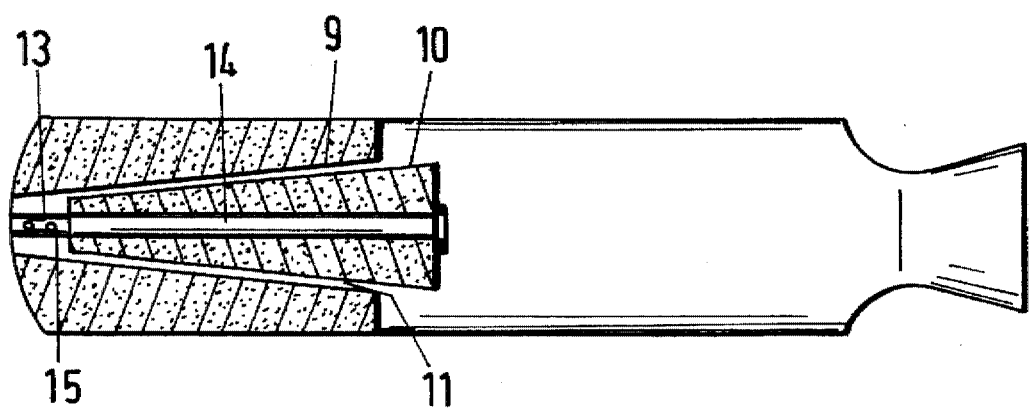
FIG. 2 is a comparable longitudinal section after burn-up of the primary grain at the time of the activation of the secondary grain.

The outer surface burner part 8 requires for its support as well as for its guidance during its axial exiting movement a central support structure 12 connected to the front wall 3 of the combustion chamber. In this case, this support structure comprises a tube 13, which is connected to the front wall 3 of the combustion chamber and has a smaller diameter, as well as a tube 14, which is connected to the outer surface burner part 8 and is axially limitedly movable on the tube 13 and consequently has a larger diameter. The support structure 12 should preferably have a positive-locking lock (not shown) for the active position shown in FIG. 2 in order to rule out unintended axial movements. The positive-locking of the grain parts may be in the form of casting the inner surface burner part 7 of the two-part grain 6 into the outer surface burner part 8 and allowing the cast inner burner part to harden into it thereby forming a detachable, positive-locking connection between the inner surface burner part 7 and the outer surface burner part 8. The igniter for the grain 6 is preferably integrated in the support structure 12, so that its gas pressure can also bring about the exiting movement of the outer surface burner part 8. Openings 15, through which the hot gases of the igniter enter the area between the grain parts and bring about their ignition, are indicated at the front end of the part 13, which is visible only partially. It should be mentioned that the support structure 12 may also accommodate at its rear end the igniter for the primary grain 5.

Radial supports may also lead to the combustion chamber wall at the rear end of the support structure (not shown), as a result of which the radial load-bearing capacity of the grain in the active state can be considerably increased. This is advantageous especially in the case of highly maneuverable missiles which abruptly change their direction.

To ensure problem-free separation of the grain parts during activation, the thermal barrier 16 is preferably provided with a predetermined breaking point (not shown separately). This breaking point or breaking line follows the contour of a separation line between the inner surface burner part 7 and the outer surface burner part 8.

The fixation of the outer surface burner part 8 according to the present invention in the active position causes the initially narrow flow gap 11 to continuously increase with increasing burning time, as a result of which the rate of burn-up caused by erosion gradually decreases. This effect should be taken into account at the time of the planning of the mission of the corresponding missile.

In summary, the present invention leads to high mechanical load-bearing capacity, high safety and reliability, as well as to good, calculable burn-up behavior at moderate design and manufacturing efforts in a solid-propellant rocket engine with at least one two-part grain.

While specific embodiments of the invention have been shown and described in detail to illustrate the application of the principles of the invention, it will be understood that the invention may be embodied otherwise without departing from such principles.

What is claimed is:

1. A solid-propellant rocket engine, comprising:
   chamber means defining a combustion chamber;
   a support structure connected to said chamber means;
   at least one thrust nozzle at a downstream end of said combustion chamber;
   a two-part grain arranged in said combustion chamber including one part forming an outwardly disposed inner surface burner part and another part forming an inwardly disposed outer surface burner part, said outer surface burner part being connected to said support structure, said outer surface burner part having a cross-section changing over its length and being arranged in a space defined by said inner surface burner part which space corresponds to a shape of said outer surface burner part, said outer surface burner part being axially displaceable relative to said inner surface burner part;
   a thermal barrier arranged at a nozzle side end of said two-part grain, said outer surface burner part being fitted gap-free into said inner surface burner part wherein a circumferential contour formed by a contact surface of said inner surface burner part and said outer surface burner part encloses a cross-section expanding from a front end of said two-part grain to a rear, nozzle-side end of said two-part grain; and
   detachable, positive-locking connection means for maintaining said inner surface burner part and said outer surface burner part connected in an inactive state and releasing the connection between said inner surface burner part and said outer surface burner part upon ignition of said two part grain, thereby allowing movement of said outer surface burner part from said inactive position into a rear, active position providing a defined flow gap between said contact surfaces of said two-part grain.

2. A solid-propellant rocket engine according to claim 1, further comprising a rear primary grain disposed between said two-part grain and said nozzle for being ignited first, said rear primary grain being designed as a one-part grain forming an inner surface burner part wherein said two-part grain is ignited subsequent to said rear primary grain.

3. A solid-propellant rocket engine according to claim 1, wherein said two-part grain forms the only propellant in said combustion chamber, the rocket engine being attached to a rocket missile to be fired from a gun wherein said combustion chamber is open toward a propellant charge of said gun whereby said combustion chamber has an open nozzle without closure plug.

4. A solid-propellant rocket engine according to claim 1, wherein said outer surface burner part of said two-part grain is formed as a circular truncated cone-shaped formation.

5. A solid-propellant rocket engine according to claim 1, wherein said inner surface burner part of said two-part grain is fastened directly to said chamber means by one of casting said inner burner part grain into said combustion chamber and hardening, and providing said inner surface burner part as a cartridge indirectly fastened in said chamber means via a connection between a cartridge wall and said chamber means.

6. A solid-propellant rocket engine according to claim 1, wherein said outer surface burner part of said two-part grain is cast into said inner surface burner part and is hardened into said inner surface burner part to form said detachable, positive-locking connection.

7. A solid-propellant rocket engine according to claim 1, wherein a throttle-side front surface of said inner surface burner part and said outer surface burner part of said two-part grain forms a continuous and gap-free contact surface for said thermal barrier in said inactive, front position of said outer burner part, said thermal barrier having a predetermined breaking point corresponding to a shape of a separation line between said inner surface burner part and said outer surface burner part on said nozzle side front surface of said two-part grain.

8. A solid-propellant rocket engine according to claim 1, wherein said support structure of said outer surface burner part of said two-part grain comprises at least two tubes which can be telescopically pulled apart to a limited extent, one of said tubes being rigidly connected to a front wall of said means defining a combustion chamber and the other of said tubes being rigidly connected to said outer surface burner part.

9. A solid-propellant rocket engine according to claim 8, wherein said support structure accommodates an igniter of said two-part grain.

10. A solid-propellant rocket engine according to claim 9, further comprising a rear primary grain which is closer to said nozzle than said two-part grain and is ignited first, prior to said two-part grain, said rear primary grain being provided as an inner surface burner part, said support structure further including an igniter for said rear primary grain.

* * * * *